United States Patent [19]
Danzy et al.

[11] Patent Number: 5,623,962
[45] Date of Patent: Apr. 29, 1997

[54] PRESSURE RELIEF VALVE

[75] Inventors: Roger D. Danzy, Pineville, La.;
George R. Holliday, Charlotte, N.C.

[73] Assignee: Dresser Industries, Dallas, Tex.

[21] Appl. No.: 552,757

[22] Filed: Nov. 3, 1995

[51] Int. Cl.$^6$ ............................................ F16K 17/08
[52] U.S. Cl. .................................. 137/469; 137/542
[58] Field of Search ............................... 137/469, 475, 137/476, 477, 478, 543.13, 538, 540, 542

[56] References Cited

U.S. PATENT DOCUMENTS

| | | |
|---|---|---|
| 2,590,656 | 3/1952 | Schnebel .......................... 137/542 X |
| 4,226,261 | 10/1980 | Ekeleme et al. ...................... 137/469 |

FOREIGN PATENT DOCUMENTS

| | | | |
|---|---|---|---|
| 2936612 | 3/1981 | Germany ............................. | 137/469 |

OTHER PUBLICATIONS

Industrial Valve Operation, Dresser Industries, Inc., *Consolidated Series—3990 PF*, pp. 1–6, no date.
Tuchenhagen North America, Inc., *Varivent® Sanitary Safety Relief Valve Type*448, 1 page, no date.

*Primary Examiner*—Stephen M. Hepperle
*Attorney, Agent, or Firm*—Haynes and Boone, L.L.P.

[57] ABSTRACT

A pressure relief valve which has a body including first and second openings for connection in a line and an interior wall defining a flow-through passageway extending from the first opening to the second opening. The body further includes a chamber having an inlet port and an outlet, the inlet port providing fluid communication between the chamber and the passageway. A guide is removably secured to the body and defines a bore extending into the chamber and an open-ended portion extending away from the chamber. A spindle is slidably disposed in the bore between a first position in which the port is open and a second position in which the disc seats in and closes the port. In the second position, the face of the disc exposed to the fluid in the passageway is recessed from the internal wall a distance no greater than one half the diameter of the passageway. A retention nut is threadingly secured to a portion of the spindle extending into the open-ended portion of the guide. A spring is disposed in the open-ended portion of the guide and bears on the spindle for biasing the spindle in the first position while fluid pressure is less than a set pressure. An adjusting screw is threadingly secured to the open-ended portion of the guide and bears against the spring for adjusting the compression of the spring and, accordingly, the set pressure.

19 Claims, 2 Drawing Sheets

PRESSURE RELIEF VALVE

BACKGROUND OF THE INVENTION

This invention relates to a valve and, more particularly, to a pressure relief valve.

Pressurized lines are commonly fitted with either rupture discs or pressure relief valves to prevent the pressure of fluid inside the lines from exceeding a prescribed limit beyond which the line or equipment connected thereto could rupture or be damaged. Rupture discs are relatively simple, comprising a simple disc which interfaces with fluid in a line. The disc comprises a skin, the thickness of which is such that when fluid pressure in a line exceeds a predetermined pressure, the disc ruptures, thereby relieving the pressure. An obvious drawback to such a rupture disc is that once pressure is relieved, there is no provision for the area of the rupture to be closed off so that normal fluid pressure may be maintained. Consequently, an entire line and often an entire system must be shut down to replace the ruptured disc.

To cure this drawback with rupture discs, particularly where it may be anticipated that the line pressure may frequently exceed the design pressure or where it is undesirable to shut down an entire system to replace such a disc, pressure relief valves (PRVs) were developed. Rather than using a disc that ruptures when pressure exceeds a predetermined pressure, PRVs utilize a valve mechanism that is maintained in a closed position by a compressed spring. The PRV includes an inlet and an outlet for fluid to flow into and out of. The inlet is connected in fluid communication with a tee in the line and the outlet is connected to an exhaust or overflow line. The compression of the spring is adjusted to keep the valve in its closed position until a pressure exceeding a predetermined pressure is impressed upon it. Once fluid on the inlet side attains a pressure which exceeds the predetermined pressure, the valve mechanism moves to an open position, fluid flows into the inlet through the PRV and out through the outlet, thereby relieving the pressure. Once the pressure is reduced to a point below the predetermined pressure, the spring moves the valve mechanism back to its closed position, and normal fluid flow through the line resumes.

There are, however, several drawbacks associated with such PRVs. For example, because there is only a single inlet, fluid does not flow through the inlet unless pressure is being relieved by the PRV. Consequently, product deposits may accumulate in the inlet and, as a consequence, plug the PRV, thereby requiring periodic maintenance of the PRV and the potential shut down of associated systems. This drawback is particularly acute in lines carrying viscous fluids that solidify at low temperatures, though the severity of this drawback may be abated somewhat by applying heat, e.g., steam tracing, the inlet to prevent the temperature of the fluid therein from falling too low. In some industries, such as the pharmaceutical, food, and beverage industries, a PRV may require maintenance on a daily basis or even more often depending on when a product used in a line is changed. Such maintenance typically requires that the PRV be removed from the line and, upon re-assembly of the PRV, that the compression of the PRV spring be re-adjusted to meet close tolerances and certified accordingly.

SUMMARY OF THE INVENTION

It is therefore an object of the present invention to provide a PRV in which product deposits retained inside the inlet to the PRV are minimized.

It is a further object of the present invention to provide a PRV of the above type in which the compression of the spring does not require adjustment every time the PRV is maintained.

It is a still further object of the present invention to provide a PRV of the above type which can be flushed and cleaned while installed in a line.

Towards the fulfillment of these and other objects, the PRV of the present invention has a body including first and second openings for connection in a line and an interior wall defining a flow-through passageway extending from the first opening to the second opening. The body further includes a chamber having an inlet port and an outlet, the inlet port providing fluid communication between the chamber and the passageway. A guide is removably secured to the body and defines a bore extending into the chamber and an open-ended portion extending away from the chamber. A spindle is slidably disposed in the bore between a first position in which the port is open and a second position in which the disc seats in and closes the port. In the second position, the face of the disc exposed to the fluid in the passageway is recessed from the internal wall a distance no greater than one half the diameter of the passageway. A retention nut is threadingly secured to a portion of the spindle extending into the open-ended portion of the guide. A spring is disposed in the open-ended portion of the guide and bears on the spindle for biasing the spindle in the first position while fluid pressure is less than a set pressure. An adjusting screw is threadingly secured to the open-ended portion of the guide and bears against the spring for adjusting the compression of the spring and, accordingly, the desired set pressure.

BRIEF DESCRIPTION OF THE DRAWINGS

The above objects and summary, as well as further objects, features and advantages of the present invention will be more fully appreciated by reference to the following detailed description of the presently preferred, but nevertheless illustrative, embodiments of the present invention when taken in conjunction with the accompanying drawings wherein.

DESCRIPTION OF THE PREFERRED EMBODIMENTS

Figure 1:
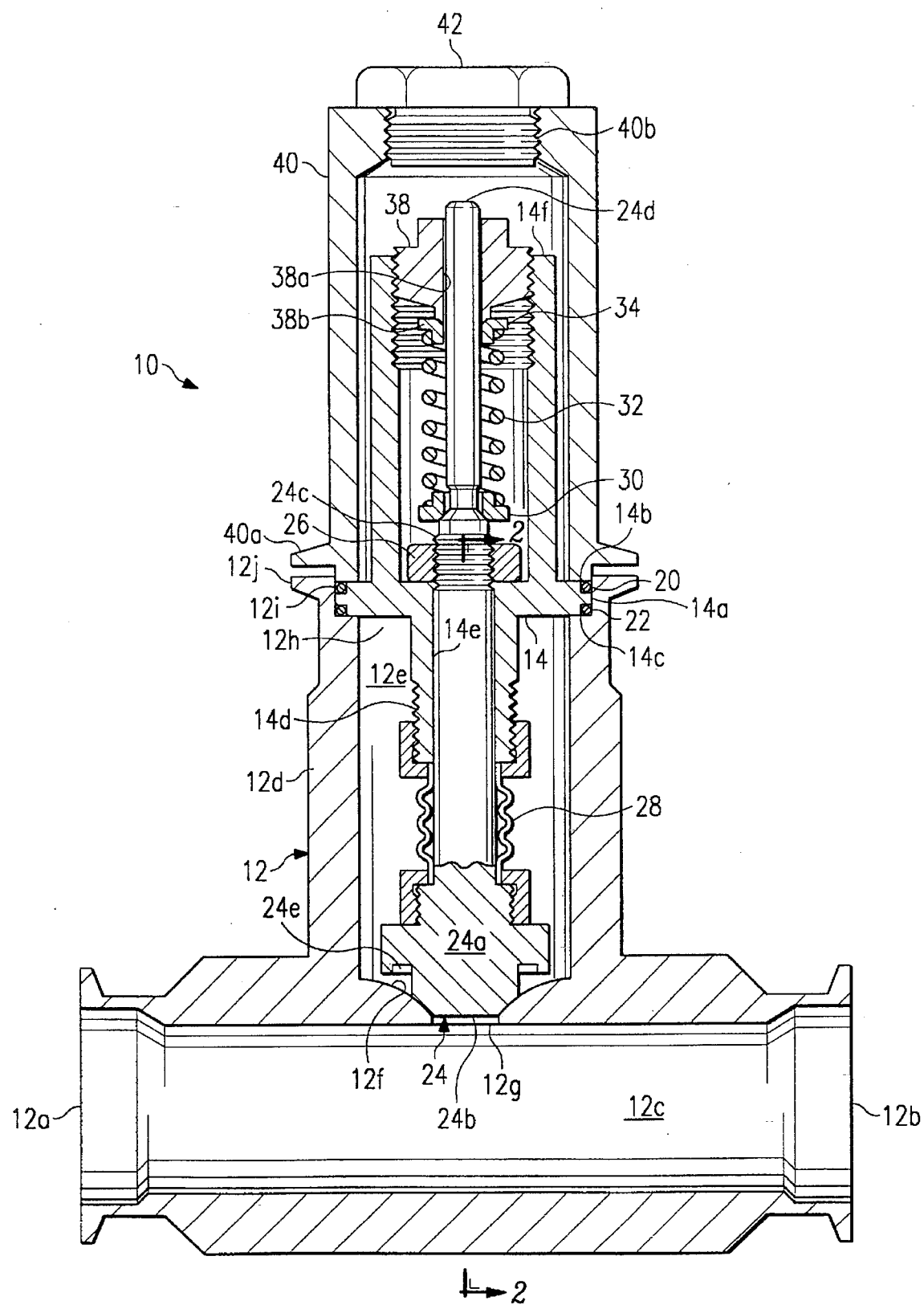
FIG. 1 is a cross-sectional view of the pressure relief valve of the present invention.
Figure 2:
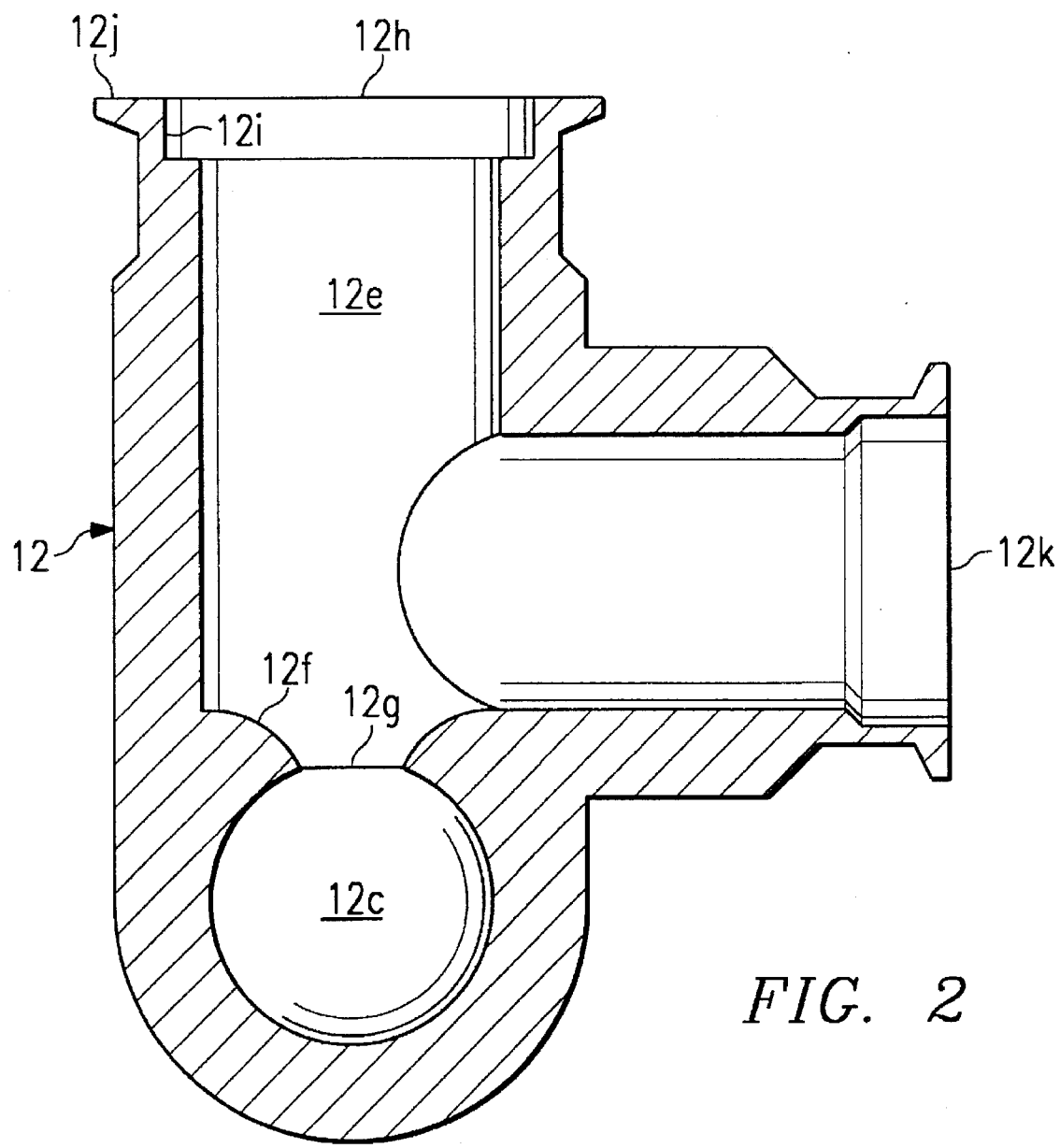
FIG. 2 is a cross-sectional view taken along the line 2—2 of FIG. 1.

In FIG. 1, the reference numeral 10 designates a pressure relief valve (PRV) embodying features of the present invention. The PRV 10 includes a body 12 having a first opening 12a and a second opening 12b for connecting the PRV 10 into a section of a line (not shown) carrying a pressurized fluid. A flow-through passageway 12c provides fluid communication between the openings 12a and 12b. As viewed in FIG. 1, the body 12 further comprises a cylindrical portion 12d which extends upwardly and defines a chamber 12e. The lower end of the chamber 12e defines a spherical valve seat 12f provided with an angle seat configuration and having a valve inlet port 12g for providing fluid communication between the passageway 12c and the chamber 12e. The upper end of the chamber 12e defines a third opening 12h having an upwardly extending annular cut-out 12i and a radially extending flange 12j. As shown in FIG. 2, an outlet 12k in fluid communication with the chamber 12e extends laterally therefrom.

With further reference to FIG. 1, a guide 14 includes a lip portion 14a extending radially therefrom which matingly seats in the cut-out 12i of the third opening 12h. Two grooves 14b and 14c circumscribing the lip portion 14a are formed in the guide 14, and two O-ring seals 20 and 22 are positioned in the grooves 14b and 14c for providing a seal between the lip 14a and the third opening 12h thereby preventing fluid discharged through the PRV 10 from passing through the opening 12h. The guide 14 further includes a lower cylindrical wall portion 14d defining a bore 14e, and an upper open-ended cylindrical wall portion 14f defining two vertical slots (not shown) for reasons to be explained.

A spindle 24 is disposed in the chamber 12e and is vertically slidable within the bore 14e, thereby enabling the spindle 24 to slide between a lower position (depicted in FIG. 1) and an upper position (not shown). The spindle 24 includes a lower spindle end 24a having a frusto-conical configuration which converges toward a flat disc portion 24b which, in the lower position shown in FIG. 1, matingly engages the seat 12f to seal the port 12g and to thereby seal off the chamber 12e from the passageway 12c. In the upper position (not shown), the lower spindle end 24a does not engage the seat 12f, thereby permitting fluid communication between the chamber 12e and the passageway 12c. A spring load retention nut 26 is threadingly secured to the spindle 24 just above the point at which the spindle 24 extends above the guide 14 (in the lower position). A set screw (not shown) is provided for locking the retention nut 26 into place on the spindle 24 and is accessible via the vertical slots. Just above the retention nut 26, the diameter of the spindle 24 reduces down, forming a spherical shoulder 24c, and a reduced diameter upper spindle portion 24d extends upwardly from the shoulder 24c within the upper cylindrical wall 14f.

As depicted in the lower position of FIG. 1, the face of the disc portion 24b exposed to the passageway 12c is recessed from the internal wall of the passageway 12c a distance no greater than one fourth the diameter of the disc portion 24b, thereby minimizing the potential for retention of product in, and consequent plugging of, the PRV 10 and, furthermore, aiding in flushing the PRV 10 between product changes.

The spindle 24 farther comprises a conventional huddle chamber 24e which provides space for fluid entering through the valve port 12g to expand and create a force lifting the spindle 24 and further opening the port 12g. A bellows 28 is attached at its lower end to the spindle 24 and at its upper end to the guide 14 for providing a seal between the guide 14 and the spindle 24, thereby preventing fluid discharged through the PRV 10 from passing upwardly between the spindle 24 and the guide 14 through the third opening 12h. The bellows 28 also provides compensation for discharge pressure, so that pressure applied to the outlet 12k (FIG. 2) of the PRV 10 does not increase the set pressure of the PRV 10. Because the huddle chamber 24e and the bellows 28 are well known in the art, they will not be described in any farther detail.

A lower spring washer 30, a helical coil spring 32, and an upper spring washer 34 are arranged on the upper spindle portion 24f as shown in FIG. 1. The washers 30 and 34 comprise sleeve portions sized to slide onto the upper spindle portion 24d, and flange portions that extend away from an appropriate end of each of the sleeve portions to secure the spring 32 therebetween on the upper spindle portion 24d. The washers 30 and 34 farther include conical surface portions which bear against the respective spherical surfaces of the shoulder 24c and an adjusting screw 38 described below.

An adjusting screw 38 is threadingly secured to the upper end of the guide 14 and includes a bore 38a for receiving the upper spindle 24d. The screw 38 further includes a spherical shoulder 38b, similar to the shoulder 24c, which bears against the conical surface of the washer 34 to compress the spring 32. Provisions (not shown) well known in the art are included for sealing the screw 38 to ensure the integrity of the set pressure of the PRV 10.

A bonnet 40 includes a flange 40a which bears down on the lip portion 14a of the guide 14 against the force of the compressed spring 32 to seat the lip portion 14a in the cut-out 12i and, while so bearing down, is secured to the flange 12j in a conventional manner, such as by a clamp or bolts and nuts (not shown). A threaded opening 40b is defined in the top of the bonnet 40 and a bonnet plug 42 is removably secured in the opening 40b to seal the opening 40a. The bonnet 40 and bonnet plug 42 thus not only enclose the upper guide portion 14d, the spring 32, the washers 30 and 34, and the nut 38 arranged on the upper spindle portion 24d, but also prevent the entry of foreign material into the bonnet 40. Furthermore, the bonnet opening 40b renders the adjusting screw 38 readily accessible.

During assembly of the PRV 10, a bonnet clamp (not shown) is used to retain the spring 32 in compression. The spring load retention nut 26 is then adjusted so that when the bonnet clamp is removed, the spring force on the spring 32 is retained between the adjusting screw 38 and the spring load retention nut 26. The addition of the retention nut 26 aids in the safe disassembly of the PRV 10 and also enables the PRV 10 to be disassembled for cleaning without tampering with the set pressure adjusting screw 38. The guide 14 is then seated in the cut-out 12i and secured thereto via the bonnet flange 40a which is secured to the flange 12j. If necessary, the adjusting screw 38 is adjusted to compress the spring 32 and to cause a predetermined downward force F1 to be applied to the spindle 24 to seat the lower spindle end 24a onto the seat 12f thereby sealing the port 12g. The openings 12a and 12b are connected, using conventional fittings (not shown), in a section of a fluid flow line (not shown) and the outlet 12k (FIG. 2) is connected to an exhaust line (not shown).

In operation, the fluid flow line and the passageway 12c are pressurized with fluid. The fluid pressure then exerts an upward force F2 onto the disc portion 24b equal to the product of the pressure and the area of the disc portion 24b exposed to the fluid pressure. The force F2 is thus directly proportional to the pressure of the fluid. If the force F2 exceeds the force F1, then the disc portion 24b as well the entire spindle 24 move upwardly permitting fluid to be discharged through the port 12g, the chamber 12e, and out through the outlet 12k (FIG. 2) to the exhaust line, thereby relieving the pressure of the fluid and reducing the force F2 on the disc portion 24b. When F2 falls below F1, the spring 32 urges the lower spindle end 24a against the seat 12f so that the disc portion 24b seals off the port 12g and fluid ceases to flow from the passageway 12c through the port 12g and the outlet 12k. Thus, whenever the pressure in the passageway 12c exceeds a predetermined "set" pressure, fluid is released and pressure is relieved, thereby ensuring that the pressure in the line does not exceed the set pressure plus the allowable overpressure. Because the set pressure is proportional to the spring force F1, the set pressure may be adjusted by tightening or loosening the adjusting screw 38 thereby increasing or decreasing, respectively, the compressive force in the spring 32 acting on the spindle 24.

It is noted that, as discussed above, the face of the disc portion 24b exposed to fluid in the passageway 12c is recessed from the internal wall of the passageway 12c a distance no greater than one fourth the diameter of the passageway 12c. It is understood that this proportion may vary from one fourth, and may, for example, be one, one-half, one-tenth, or even zero (if the face of the disc portion 24b is flush with the internal wall of the passageway 12c). It is further understood, though, that as the proportion is increased, the advantages described above which accrue from a small ratio accordingly decrease, which advantages include reducing the potential for the retention of product in, and consequent plugging of, the PRV 10 and, also aiding in the flushing and cleaning of the PRV 10 between product changes.

It is further noted that references made above regarding the location of one component or aspect of the present invention relative to another component or aspect are made with reference to the orientation of the invention as depicted in FIG. 1. It is understood that the present invention may be utilized in a variety of orientations wherein such relative locations would change accordingly.

It is further understood that the spring 32 may be supplemented or replaced with other resilient elements such as a pneumatically controlled compressible fluid or an electromechanical actuator. The compressible fluid may, for example, include air contained within an air bag configured and arranged to impress a downward bias onto the spindle 24 within the bonnet 40.

It is still further understood that other variations in the present invention are contemplated and in some instances, some features of the invention can be employed without a corresponding use of other features. Accordingly, it is appropriate that the appended claims be construed broadly in a manner consistent with the scope of the invention.

What is claimed is:

1. A pressure relief valve for connection in a line carrying a pressurized fluid, and for releasing a portion of said fluid when the fluid pressure in said line exceeds a set pressure, said valve comprising:

a body having an interior wall defining a passageway extending through said body, said body being correctable in-line between an upstream portion of said line and a downstream portion of said line and being configured such that substantially all of said pressurized fluid that flows from said upstream portion of said line to said downstream portion of said line flows through said passageway, said body further including a chamber having an inlet port and an outlet, said inlet port providing fluid communication between said chamber and said passageway;

a spindle disposed in said chamber and including a disc formed on one end of said spindle, said spindle being slidable between a first position in which said disc is removed from said port and fluid communication is established between said chamber and said passageway, and a second position in which said disc seals said port to prevent fluid communication between said chamber and said passageway, and wherein, in said second position, the face of said disc exposed to said fluid in said passageway is recessed from said internal wall a distance no greater than one half the diameter of said passageway;

a guide removably secured to said body and defining a bore extending into said chamber for slidably receiving a portion of said spindle and guiding said spindle between said first and second positions, said guide further defining an open-ended portion into which said spindle extends away from said chamber;

a retention nut threadingly secured to a portion of said spindle extending from said bore;

a spring disposed in said open-ended portion of said guide and bearing on said spindle for biasing said spindle in said first position while said fluid pressure is less than said set pressure; and an adjusting screw threadingly secured to said open-ended portion and bearing against said spring for adjusting the compression of said spring and for adjusting said set pressure.

2. The valve of claim 1 wherein, in said second position, the face of said disc exposed to flow in said passageway is recessed from said internal wall a distance no greater than one fourth the diameter of said passageway.

3. The valve of claim 1 wherein, in said second position, the face of said disc exposed to flow in said passageway is recessed from said internal wall a distance no greater than one tenth the diameter of said passageway.

4. The valve of claim 1 wherein said adjusting screw includes a bore into which said spindle slidingly extends.

5. The valve of claim 1 wherein said spindle includes a shoulder against which said spring bears.

6. A pressure relief valve in fluid communication with a pressurized fluid, for releasing a portion of said fluid when the fluid pressure exceeds a set pressure, comprising:

a body defining a chamber having an inlet port and an outlet, said inlet port providing fluid communication between said chamber and said fluid;

a spindle disposed in said chamber and including a disc formed on one end of said spindle, said spindle being slidable between a first position in which said disc is removed from said port and fluid communication is established between said chamber and said fluid, and a second position in which said disc seals said port to prevent fluid communication between said chamber and said fluid;

a guide removably secured to said body and defining a bore extending into said chamber for slidably receiving a portion of said spindle and guiding said spindle between said first and second positions, said guide further defining an open-ended portion into which said spindle extends away from said chamber;

a retention nut threadingly secured to a portion of said spindle extending from said bore;

a spring disposed in said open-ended portion of said guide and bearing on said spindle for biasing said spindle in said first position while said fluid pressure is less than said set pressure; and an adjusting screw threadingly secured to said open-ended portion and bearing against said spring for adjusting the compression of said spring and for adjusting said set pressure.

7. The valve of claim 6 adapted for connection in a line carrying said pressurized fluid wherein said body includes a first opening and a second opening for connection in said line, and an interior wall defining a passageway extending from said first opening to said second opening; and wherein, in said second position, the face of said disc exposed to said fluid in said passageway is recessed from said internal wall a distance no greater than one half the diameter of said passageway.

8. The valve of claim 7 wherein, in said second position, the face of said disc exposed to said fluid in said passageway is recessed from said internal wall a distance no greater than one fourth the diameter of said passageway.

9. The valve of claim 7 wherein, in said second position, the face of said disc exposed to said fluid in said passageway is recessed from said internal wall a distance no greater than one tenth the diameter of said passageway.

10. The valve of claim 6 wherein said adjusting screw includes a bore into which said spindle slidingly extends.

11. The valve of claim 6 wherein said spindle includes a shoulder against which said spring bears.

12. A pressure relief valve in fluid communication with a pressurized fluid, for releasing a portion of said fluid when the fluid pressure exceeds a set pressure, comprising:

a body defining a chamber having an inlet port and an outlet, said inlet port providing fluid communication between said chamber and said fluid;

a spindle disposed in said chamber and including a disc formed on one end of said spindle, said spindle being slidable between a first position in which said disc is removed from said port and fluid communication is established between said chamber and said fluid, and a second position in which said disc closes said port to prevent fluid communication between said chamber and said fluid;

a guide removably secured to said body and having a bore extending into said chamber for slidably receiving a portion of said spindle and guiding said spindle between said first and second positions, said guide further defining an open-ended portion into which said spindle extends away from said chamber;

a retention nut secured to a portion of said spindle extending from said bore;

resilient means disposed in said open-ended portion of said guide and bearing on said spindle for biasing said spindle in said first position while said fluid pressure is less than said set pressure; and an adjusting screw threadingly secured to said open-ended portion and bearing against said resilient means for adjusting the compression of said resilient means and for adjusting said set pressure.

13. The valve of claim 12 adapted for connection in a line carrying said pressurized fluid wherein said body includes a first opening and a second opening for connection in said line, and an interior wall defining a passageway extending from said first opening to said second opening; and wherein, in said second position, the face of said disc exposed to said fluid in said passageway is recessed from said internal wall a distance no greater than one half the diameter of said passageway.

14. The valve of claim 13 wherein, in said second position, the face of said disc exposed to said fluid in said passageway is recessed from said internal wall a distance no greater than one fourth the diameter of said passageway.

15. The valve of claim 13 wherein, in said second position, the face of said disc exposed to said fluid in said passageway is recessed from said internal wall a distance no greater than one tenth the diameter of said passageway.

16. The valve of claim 12 wherein said adjusting screw includes a bore into which said spindle slidingly extends.

17. The valve of claim 12 wherein said spindle includes a shoulder against which said resilient means bears.

18. The valve of claim 12 wherein said resilient means includes a spring.

19. The valve of claim 12 wherein said resilient means includes a pneumatically controlled compressible fluid.

* * * * *

UNITED STATES PATENT AND TRADEMARK OFFICE
CERTIFICATE OF CORRECTION

PATENT NO. : 5,623,962
DATED : April 29, 1997
INVENTOR(S) : Roger D. Danzy and George R. Holliday It is certified that error appears in the above-indentified patent and that said Letters Patent is hereby corrected as shown below:

Column 3, line 36, change "farther" to --further--.
Column 3, line 50, change "farther" to --further--.

Claim 1, lines 36 and 37, change "correctable" to --connectable--.

Signed and Sealed this

Seventh Day of October, 1997

Attest:

BRUCE LEHMAN

Attesting Officer

Commissioner of Patents and Trademarks